United States Patent
Kalbassi et al.

[11] Patent Number: 5,846,295
[45] Date of Patent: Dec. 8, 1998

[54] TEMPERATURE SWING ADSORPTION

[75] Inventors: Mohammed Ali Kalbassi, Walton-on-Thames; Rodney John Allam, Guildford, both of England; Timothy Christopher Golden, Allentown, Pa.

[73] Assignee: Air Products and Chemicals, Inc., Allentown, Pa.

[21] Appl. No.: 812,564

[22] Filed: Mar. 7, 1997

[51] Int. Cl.$^6$ .......................... B01D 53/04; B01D 53/28
[52] U.S. Cl. .................. 95/105; 95/106; 95/120; 95/123; 95/139; 95/145
[58] Field of Search .............. 95/104–106, 114, 95/115, 117–126, 139, 145

[56] References Cited

U.S. PATENT DOCUMENTS

| | | | |
|---|---|---|---|
| 3,533,221 | 10/1970 | Tamura | 95/105 |
| 3,557,025 | 1/1971 | Emerson et al. | 252/463 |
| 3,594,984 | 7/1971 | Toyama et al. | 95/126 |
| 3,629,153 | 12/1971 | Pryer | 252/463 |
| 3,710,547 | 1/1973 | Nelson | 95/123 X |
| 3,738,084 | 6/1973 | Simon et al. | 95/105 |
| 3,865,924 | 2/1975 | Gidaspow et al. | 423/230 |
| 4,233,038 | 11/1980 | Tao | 95/104 |
| 4,249,915 | 2/1981 | Sircar et al. | 55/26 |
| 4,264,340 | 4/1981 | Sircar et al. | 95/139 X |
| 4,433,981 | 2/1984 | Slaugh et al. | 55/59 |
| 4,472,178 | 9/1984 | Kumar et al. | 95/139 X |
| 4,493,715 | 1/1985 | Hogan et al. | 55/68 |
| 4,627,856 | 12/1986 | von Gemmingen | 95/120 |
| 4,711,645 | 12/1987 | Kumar | 55/26 |
| 4,775,396 | 10/1988 | Rastelli et al. | 95/139 X |
| 4,986,835 | 1/1991 | Uno et al. | 95/139 X |
| 5,137,548 | 8/1992 | Grenier et al. | 55/23 |
| 5,156,657 | 10/1992 | Jain et al. | 95/139 X |
| 5,232,474 | 8/1993 | Jain | 55/26 |
| 5,447,558 | 9/1995 | Acharya | 95/104 |
| 5,453,112 | 9/1995 | Sinicropi et al. | 95/106 X |
| 5,486,227 | 1/1996 | Kumar et al. | 95/115 X |
| 5,518,527 | 5/1996 | Tomizuka et al. | 95/104 X |
| 5,520,721 | 5/1996 | Fraysse et al. | 95/114 |
| 5,560,763 | 10/1996 | Kumar | 95/105 X |
| 5,614,000 | 3/1997 | Kalbassi et al. | 95/106 X |
| 5,656,064 | 8/1997 | Golden et al. | 95/104 X |

FOREIGN PATENT DOCUMENTS

| | | | |
|---|---|---|---|
| 3045451 | 7/1981 | Germany | 95/139 |
| 61-025640 | 2/1986 | Japan | 95/122 |
| 63-107720 | 5/1988 | Japan | 95/139 |

*Primary Examiner*—Robert Spitzer
*Attorney, Agent, or Firm*—Geoffrey L. Chase

[57] ABSTRACT

Temperature swing adsorption to remove $CO_2$ from a gas stream is conducted using alumina to adsorb all the water and at least most of the carbon dioxide from the gas stream. Optionally a downstream zone of zeolite may be provided to remove further carbon dioxide and hydrocarbons.

26 Claims, 4 Drawing Sheets

TEMPERATURE SWING ADSORPTION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to temperature swing adsorption processes for removing at least carbon dioxide and water from a feed gas to form a purified gas for subsequent cryogenic treatment.

When a feed gas is to be subjected to a cryogenic treatment such as for instance the cryogenic separation of air into oxygen and nitrogen, it is essential to remove components such as carbon dioxide and water which would freeze and interfere with the subsequent cryogenic treatment. It is also necessary to remove trace hydrocarbons such as acetylene if present which would otherwise accumulate in the cryogenic treatment and cause an explosion risk. Two methods generally used for removing carbon dioxide and water from a feed gas by adsorption on to a solid adsorbent are temperature swing adsorption (TSA) and pressure swing adsorption (PSA). In each of these techniques, a bed of adsorbent is exposed to a flow of feed gas for a period to adsorb carbon dioxide and water from the feed gas. Thereafter, the flow of feed gas is shut off from the adsorbent bed and the adsorbent is exposed to a flow of purge gas which strips the adsorbed gas and water from the adsorbent and regenerates it for further use. In TSA, the heat needed to desorb the carbon dioxide and the water from the adsorbent in the regeneration phase is supplied by heated regenerating gas. In PSA, the pressure of the purge gas is lower than that of the feed gas and the change in pressure is used to remove the carbon dioxide and water from the adsorbent with the heat required for desorption being supplied by the heat of adsorption retained within the bed. Generally, the pressure of the regenerating gas is lower than that of the feed gas in TSA also. However, in a TSA process, the adsorption phase is carried on for a prolonged period and the heat of adsorption of the carbon dioxide and water on the adsorbent liberated during most of the adsorption phase is displaced out of the bed by the flow of gas. It is necessary that the adsorbent bed has a substantial capacity for adsorbing carbon dioxide and water.

In a PSA process by contrast, the duration of the adsorption phase has to be short so that the heat of adsorption is not displaced out of the bed by the flow of feed gas before the regeneration phase starts. Because of the short cycle used, it is not necessary that the adsorbent has any substantial capacity for the components which are being adsorbed.

In the removal of carbon dioxide and water from air prior to a cryogenic air separation process, it has been common practice to use as the adsorbent a molecular sieve such as zeolite 13X both for TSA and for PSA. U.S. Pat. No. 5,137,548 (Grenier) for instance discloses a TSA process of this kind. As is also disclosed there, the difference between the temperature of the regenerating gas and the temperature at which adsorption is conducted need not exceed 50° C. and can be substantially less provided that the flow of regeneration gas is sufficient to provide the requisite heat of desorption.

As also disclosed there, it is possible to include a bed of alumina upstream of the zeolite adsorbent. This serves to adsorb most of the water, leaving the zeolite to adsorb the carbon dioxide. The use of alumina and molecular sieve zeolite in this way is further described in U.S. Pat. No. 4,711,645 (Kumar) in the context of PSA. As explained there, the benefit of using an upstream bed of alumina in the adsorbent is that because the heat of adsorption of water in alumina is less than that in zeolite, there is a lower overall temperature change in the initial water removal step than if one employed a single bed of zeolite for removal of water and carbon dioxide. A more effective operation is provided by the process because of the adsorption capacity of the zeolite at the lower adsorption temperature of the bed which is then obtainable.

U.S. Pat. No. 5,232,474 (Jain) proposes the use of an alumina adsorption bed for the removal of both water and carbon dioxide from air prior to cryogenic air separation. The process used is PSA and is operated so as to remove at least 90 percent of the carbon dioxide from the gas stream. Optionally, a second adsorption zone is provided containing a zeolite to remove residual carbon dioxide and other impurities such as hydrocarbons from the gas stream. It is noted there that the use of alumina to remove substantial amounts of carbon dioxide was contrary to the teachings of the art which recognised its use only for removing moisture from gas streams. Activated alumina has, at most, only one fifth of the absolute capacity of 13X zeolite for carbon dioxide adsorption. It was noted however that alumina has the ability to be completely regenerated in PSA processes whereas 13X zeolite is only partially regenerated and that under PSA conditions, the effective carbon dioxide capacity (the difference between adsorption and regeneration step loadings) for activated alumina was therefore at least as high as 13X zeolite with the added advantage that the alumina adsorbs significantly less nitrogen rich waste gas compared to zeolite so reducing vent gas loses by 50 percent or more with considerable energy savings.

As noted above, it is not necessary in a PSA system for the adsorbent to have a substantial equilibrium $CO_2$ capacity because of the short cycles used. Accordingly, the use of alumina without zeolite was considered to be compatible with the PSA mode of operation. U.S. Pat. No. 5,232,474 does not however suggest that alumina is suitable for use as the only or principal carbon dioxide adsorbent in a TSA process where, for the reasons noted above, it is necessary that the adsorbent have substantial capacity for the component adsorbed.

U.S. Pat. No. 4,249,915 (Sircar) discloses the use of alumina in a PSA section of an adsorbent apparatus which also has a TSA section containing zeolite. The PSA section containing alumina is used for removing water and the TSA section is used for removing carbon dioxide. It is indicated that the TSA section must employ an adsorbent selective towards very dilute $CO_2$ such as certain molecular sieves, clearly implying that the alumina used in the PSA section cannot be used in TSA.

U.S. Pat. No. 3,865,924 (Gidaspow) describes the removal of carbon dioxide from a gas stream using a modified alumina. The process is described as being particularly suitable for removal of carbon dioxide from air being breathed in confined quarters such as submarines although it is indicated that the process may be used for the removal of carbon dioxide from various gases such as the removal of carbon dioxide from hydrogen for feeding a fuel cell. Although not named as such, the process described is essentially a TSA process. The alumina adsorbent is in powdered form and is modified by being mixed with finely divided alkali metal carbonate, especially potassium carbonate. It is indicated that the presence of water is essential to the sorption of the carbon dioxide by this composition, the carbon dioxide undergoing a chemical reaction with the potassium carbonate and the water to form bicarbonate. It is indicated that the adsorbent can be regenerated at temperatures of 80° C. or above and that the differential in temperature between the adsorption and the regeneration stages can be as little as 20° C.

The process described is however unsuitable for large-scale operation and is unsuitable for use prior to a cryogenic process. As noted, the presence of water is indicated to be essential to the sorption process described. Accordingly, the output gas is not to be dried and could not therefore be supplied as the feed gas of a cryogenic process. Also, the adsorbent is powdered and could not be used in a large-scale adsorption process because of the enormous pressure drop which a powdered adsorbent would create.

A number of other proposals have been made for using alumina modified by treatment with alkali. Generally however, these proposals depend upon calcining the material with which the alumina is treated with a view to forming an alkali metal oxide. This gives rise to an adsorbent which removes carbon dioxide from a gaseous stream such that the adsorbent could not be regenerated without the use of high temperatures.

For instance, U.S. Pat. No. 3,557,025 (Emerson) describes the use of alumina mixed with alkali metal bicarbonate and heated to a temperature of 150° C. for a period of hours to produce a compound of the formula $NaAl(OH)_2CO_3$. This is used for the adsorption of sulphur dioxide but it is not disclosed that the adsorbent is capable of being regenerated.

U.S. Pat. No. 3,629,153 (Pryer) describes the preparation of an alkalised alumina composition by adding granular or hydrated alumina to hot sodium hydroxide solution and reacting the product with ammonium carbonate or carbon dioxide. The product of this reaction (dawsonite) is converted to alkalised alumina by heating at temperatures of up to 1000° C. The product is useful for the adsorption of water vapour, hydrogen sulphide, sulphur dioxide and other acidic type gases. It is not suggested that the product could be useful in a TSA process for adsorbing carbon dioxide and water.

U.S. Pat. No. 4,433,981 (Slaugh) does relate to removing carbon dioxide from gas streams, typically hydrocarbon process streams or breathable air. It discloses impregnating a porous aluminum oxide support with an alkali metal compound decomposable on calcination to the alkali metal oxide and heating at calcination temperatures. Regeneration of the adsorbent is conducted at very high temperatures such as 575° C. for prolonged periods such as 16 hours. Such an adsorbent would not be economically useful in a TSA process for purifying a gas prior to a cryogenic operation, having regard to the extremely high energy requirement for the regeneration step.

U.S. Pat. No. 4,493,715 (Hogan) contains a similar disclosure. Lower calcination temperatures are used such as 260° C. for 5 hours and regeneration is conducted at a similar temperature. Nonetheless, the energy required to desorb $CO_2$ from the adsorbent would be excessive and would rule out the use of such an adsorbent from an economic carbon dioxide and water removal process.

BRIEF SUMMARY OF THE INVENTION

Contrary to the implications of U.S. Pat. No. 4,249,915 and the teaching of U.S. Pat. No. 5,232,474, we have now found that activated alumina can be used in a TSA system which can operate at a low regeneration temperature if desired, with the alumina serving to adsorb the water from the feed gas and all or most of the carbon dioxide. Other undesirable components if present may also be wholly or partially adsorbed and removed, such as hydrocarbons including acetylene and nitrogen oxides.

The present invention now provides a process for the temperature swing adsorption of at least carbon dioxide and water from a feed gas to form a purified gas for subsequent cryogenic treatment, comprising contacting the feed gas at a first temperature with a solid adsorbent comprising agglomerates of activated alumina, optionally impregnated with an adsorption enhancing impregnant, so as to produce a dried, purified gas from which at least most of the carbon dioxide has been removed, and periodically regenerating the adsorbent by contacting the adsorbent with a regenerating gas at a second temperature in excess of said first temperature but below the calcining temperature of the impregnant if present.

By references herein to the water and carbon dioxide being removed, we mean the reduction of the water and carbon dioxide content to the level required for the supply of the gas for use in a cryogenic process.

BRIEF DESCRIPTION OF THE SEVERAL VIEWS OF THE DRAWINGS

The invention will be further described and illustrated with reference to the accompanying drawing and the following examples.

DETAILED DESCRIPTION OF THE INVENTION

Figure 1:
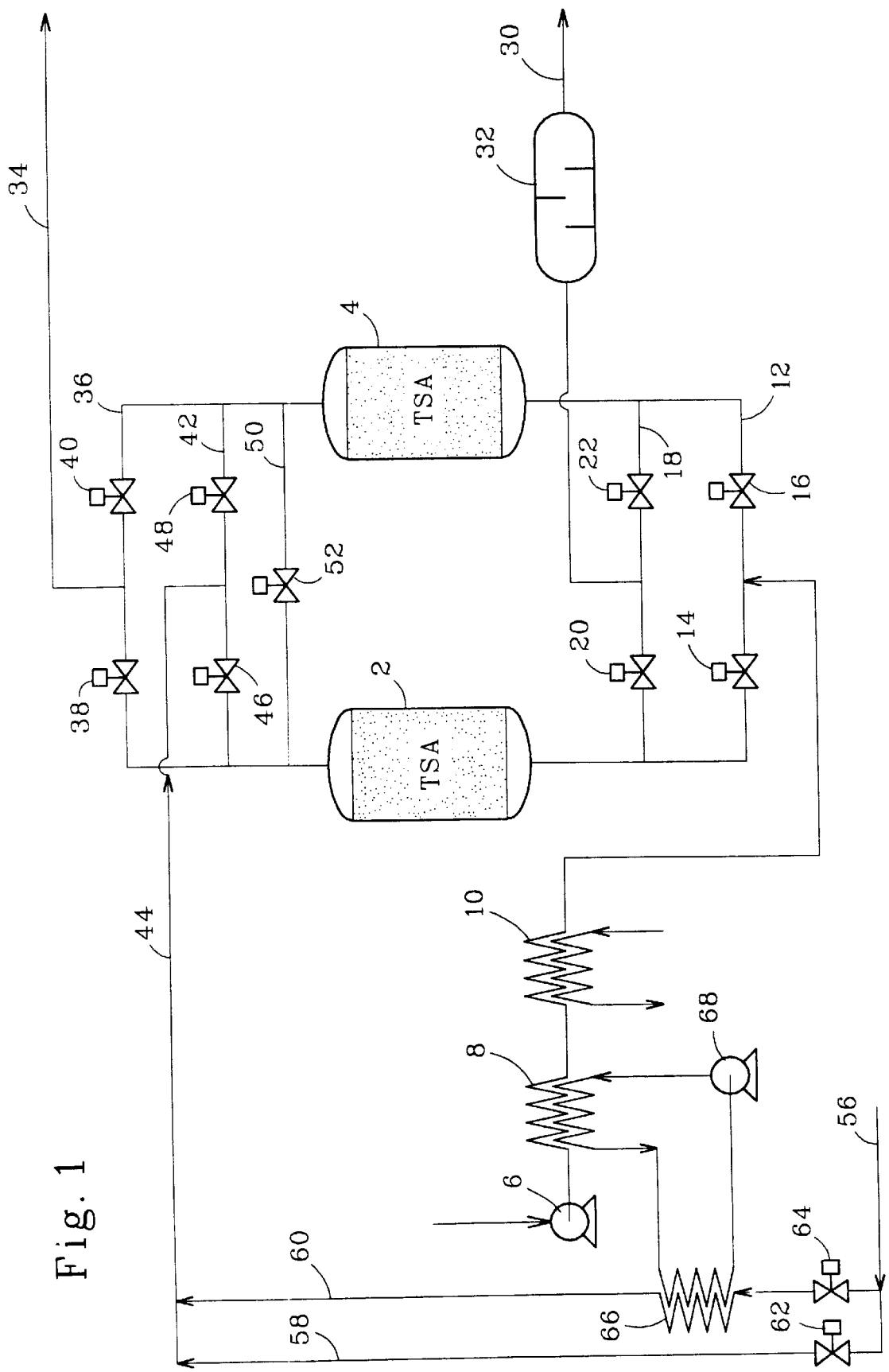
FIG. 1 shows in schematic form apparatus for use in practising the invention.

The feed gas is preferably air and the process according to the invention may further comprise subsequent cryogenic treatment of the purified air produced by the adsorption process defined above. The cryogenic process may preferably be a cryogenic air separation process, e.g., one in which oxygen is separated from nitrogen. However, a wide variety of other gases may be treated to remove carbon dioxide and water in accordance with the invention including natural gas, hydrocarbons and synthesis gas containing low levels of $CO_2$.

The alumina is present in the process in the form of agglomerates such as granules or beads. The production of activated alumina in the form of such agglomerates is well known in the art and requires no detailed description here. Generally, alumina is mixed with water and is heated to form nonfriable robust agglomerates which can be packed into an adsorbent bed to produce low pressure drop and resistance to the production of fine particles (dust).

The term "activated alumina" as used herein includes such materials as are commercially available. Those skilled in the art are aware that such materials typically are not 100 percent alumina and will contain small percentages of other materials such as ferric oxide, sodium oxide, silica and the like. Certain commercially available activated alumina products are even formulated to contain specified amount of these and other materials to enhance their activity and confer other beneficial properties. Activated aluminas for use in this invention may be conventional alumina (e.g., Alcan AA300, Alcan F200, La Roche A201, Rhone Poulenc Grade A etc.) with typical physical and chemical properties as shown below:

| Chemical Analysis | |
|---|---|
| | Wt % |
| $SiO_2$ | 0.02 |
| $Fe_2O_3$ | 0.02–0.04 |
| $TiO_2$ | 0.002–0.01 |
| $Na_2O$ | 0.3–0.4 |
| $Al_2O_3$ | >93 |
| Loss on Ignition | 3–7 |

All of the above products can be used in the process of this invention.

The purification process is conducted in such a way that the purified gas produced is dry, i.e., water-free to the extent of having a dew point compatible with cyrogenic applications, e.g., of −180° C. or less.

Furthermore, most of the initial carbon dioxide content of the gas is removed in the adsorption process. Preferably, the adsorption process is operated to remove at least about 70 percent, more preferably 80 percent and most preferably at least 85 or 90 percent of the carbon dioxide contained in the gas stream. Most preferably, the process is conducted so as to adsorb substantially all the carbon dioxide contained in the gas stream within the alumina bed. Optionally however, further means may be provided for removing the remainder of the carbon dioxide from the gas stream after the alumina adsorption process.

If not all of the carbon dioxide is removed by the alumina adsorbent, there is preferably provided a body of zeolite downstream (in the direction of feed gas flow) from the alumina adsorbent for adsorbing residual carbon dioxide and/or hydrocarbons. The zeolite may be of various kinds, 13X zeolite is particularly preferred. The zeolite may be present in a second adsorption bed but more preferably forms a downstream part of a composite adsorption bed containing also the alumina. The process may be operated such that the alumina serves normally to adsorb all of the carbon dioxide with the zeolite being present to act as a guard against the breakthrough of carbon dioxide and hydrocarbons if present.

It is important however, to ensure that the water is all adsorbed in the alumina bed and is not passed on to the zeolite bed.

Optionally, the zeolite in the second adsorption bed may be mixed with alumina.

Optionally, the water content of the feed gas may be reduced prior to the TSA adsorption process by cooling the feed gas to condense water from it in a manner known in the art.

To enhance the adsorption capacity of the alumina, it may be impregnated with an adsorption enhancing impregnant. This process may be as described in U.S. Ser. No. 08/538,876 filed 4 Oct. 1995, now U.S. Pat. No. 5,656,064 (European Patent Application No. 96307224.4), incorporated herein by reference.

The adsorbent may be formed by impregnating alumina with a basic solution having a pH of 9 or more.

The beneficial effect of the treatment of the alumina with a basic solution may be due to the reaction of carbon dioxide with hydroxide ions in the basic environment of the alumina surface to form bicarbonate ions, although the applicant does not wish to be bound by this theory.

Preferably, the pH of the impregnating solution is at least 10, more preferably from 10 to 12. Best results have been obtained using an impregnating solution having a pH of about 11.

It is further preferred that the pH of the impregnating solution is related to the zero point charge (zpc) of the alumina according to the formula:

$$pH \geq zpc - 1.4$$

or more preferably by the formula:

$$zpc + 2 \geq pH \geq zpc - 1.4$$

Most preferably, the pH of the impregnating solution is related to the zero point charge of the alumina by the formula:

$$zpc + 1 \geq pH \geq zpc - 1$$

Said basic solution may suitably be a solution of an alkali metal or ammonium compound such as one selected from hydroxides, carbonates, bicarbonates, phosphates, and organic acid salts. Suitable basic compounds that may be employed include sodium, potassium or ammonium carbonate, hydroxide, phosphate bicarbonate, nitrate, formate, acetate, benzoate or citrate.

The most preferred basic compound for use in the invention is potassium carbonate.

The TSA process of the invention is preferably applied to the removal of water and carbon dioxide from gas streams in which carbon dioxide is present at a low level such as 400 ppm carbon dioxide prior to the adsorption process.

In TSA, one normally employs a flow of a regenerating gas, low in $CO_2$ content, normally nitrogen rich wash gas from a downstream air separation unit to desorb the $CO_2$ from the adsorbent.

Preferably the feed gas is supplied at a pressure of from 2 to 20 bara, more preferably 2 to 15 bara.

Feed gas is preferably supplied at a temperature of from 5° to 50° C., more preferably from 10° to 40° C.

Preferably the process is operated at a P/A ratio (molar flow of regenerating gas to feed gas) of from 0.1 to 0.8, more preferably from 0.2 to 0.5.

Suitably, the gas is fed to the adsorbent for a period of from 60 to 600 minutes prior to regeneration of the adsorbent. However, the most advantageous time period here will depend upon the size of the adsorbent bed used. Generally, it will be preferable for the on-line period to be from 70 to 300 minutes.

The regenerating gas should be fed to the adsorbent at a temperature which exceeds the temperature of the feed gas. The regenerating gas is preferably fed at a temperature of from 30° to 150° C. Suitably it is fed at a pressure of 0.5 to 8 bara and preferably this is no more than 50 percent of the pressure which the feed gas is supplied. More preferably, the regenerating gas is fed to the adsorbent at a pressure of from 1 to 3 bara. Note however that the system could be designed with regenerating gas pressure higher than the feed gas pressure provided the purge to feed ratio and the purge temperature were high enough.

As is conventional in a TSA operation, there are preferably at least two separate bodies or beds of adsorbent which can be placed on-line in substitution for one another whilst regeneration is taking place in another or the other bed.

Generally, the apparatus used for conducting the process according to the invention may be conventional TSA apparatus as previously widely described and used in this art except of course for the substitution of the alumina adsorbent required in the present invention for the zeolite or alumina/zeolite adsorbents previously employed.

Preferably, however, measures are adopted to recover heat from compressors used for supplying the feed gas to the process and for supplying this heat to warm the regenerating gas. It is particularly advantageous that regeneration may be achieved at temperatures sufficiently low that the necessary heat can be obtained as waste heat generated by the gas compressor used to pressurise the gas to be purified.

DETAILED DESCRIPTION OF PREFERRED EMBODIMENTS

As shown in FIG. 1, apparatus for use in practising the invention comprises at least a pair of adsorbent beds containing columns or vessels 2, 4 each containing an alumina adsorbent as described in detail hereafter. Air to be purified is supplied to the apparatus from a main air compressor 6. Heat produced during the compression of the air in the compressor 6 is removed as described later if desired in heat exchangers 8 and 10. The compressed air is then supplied to inlet manifold 12 containing control valves 14 and 16 to which is connected the pair of adsorbent bed containing columns 2 and 4. The inlet manifold is bridged downstream of the control valves 14, 16 by a venting and depressurising manifold 18 containing venting valves 20 and 22 which serve to close and open connections between the upstream ends of respective adsorbent columns 2 and 4 and a vent 30 fitted with a silencer 32. The apparatus has an outlet for purified gas 34 connected to the downstream ends of the two adsorbent columns 2, 4 by an outlet manifold 36 containing control valves 38 and 40 upstream of which the outlet manifold 36 is bridged by a regenerating gas manifold 42 connected to a line 44 supplying regenerating gas as described in more detail hereafter and containing control valves 46, 48 by which the flow of regenerating gas may be connected selectively to either of the adsorbent containing columns 2, 4.

A further manifold 50 containing a control valve 52 bridges between the downstream ends of the columns 2, 4 for the purpose of repressurisation.

The purified gas produced is supplied to the cold box of an air separation unit which separates air into oxygen and nitrogen. Dry carbon dioxide-free gas from the cold box is supplied to the illustrated apparatus at an inlet 56 which is connected to the inlet for regenerating gas 44 via two selectable paths 58 and 60 controlled by respective control valves 62 and 64. Path 58 leads the regenerating gas directly to the regenerating gas inlet 44 whereas path 60 leads through a heat exchanger 66 in which the regenerating gas receives heat from water circulated by a pump 68 through heat exchanger 8 and heat exchanger 66.

Heat exchanger 10 is provided with a cold water inlet and a cold water outlet for controlling the temperature of the feed gas supplied to the apparatus.

The operation of all of the control valves may be controlled by suitable programmable timing and valve operating means as known in the art.

In operation, air is compressed in the main air compressor 6 and is supplied to the inlet manifold 12 from where it is fed into one of the two adsorbent columns or vessels 2, 4, depending upon which is currently on-line and which is in its regeneration phase. Purified air leaving the column passes via open valve 38 or open valve 40 to the outlet 34 and hence to the cold box of the air separation process. If it is column 2 which is currently on-line, then valves 16, 20, 52, 46 and 40 would all be closed at this stage. The flow of gas through the column 2 is continued until the adsorbent is so loaded with water and carbon dioxide that it is necessary for it to be regenerated. At this stage, valves 14 and 38 are closed and valves 16 and 40 are opened to place the other column 4 on-line and to allow column 2 to be regenerated. For this purpose valve 20 is opened to depressurise the column through vent 30. Dry nitrogen rich waste gas from the cold box is then introduced through valve 64 to pass through the heat exchanger 66 where it is warmed to a regeneration temperature and supplied through inlet 44 to the downstream end of the column 2 through which the gas passes in the reverse of the feed direction to the vent 30.

When sufficient heat has been supplied for regeneration, valve 64 is closed and valve 62 is opened so as to supply cool regenerating dry nitrogen rich waste gas and to lower the temperature of the bed before it goes back on-line so as to avoid sending heat to the cold box following repressurisation. At the appropriate time when it is necessary to regenerate bed 4, the operation is reversed so that valves 14 and 38 are reopened and column 2 is placed back on-line while column 4 is regenerated.

It will be appreciated however that the use of heat recovered from the main air compressor, as in heat exchanger 8, for heating the regeneration gas is only one option. Generally, if regeneration temperatures of greater than 90° C. are chosen, this option will be inappropriate as the grade of heat available will be inadequate. Where it is not desired to use such waste heat, the regeneration gas may be otherwise heated.

Figure 2:
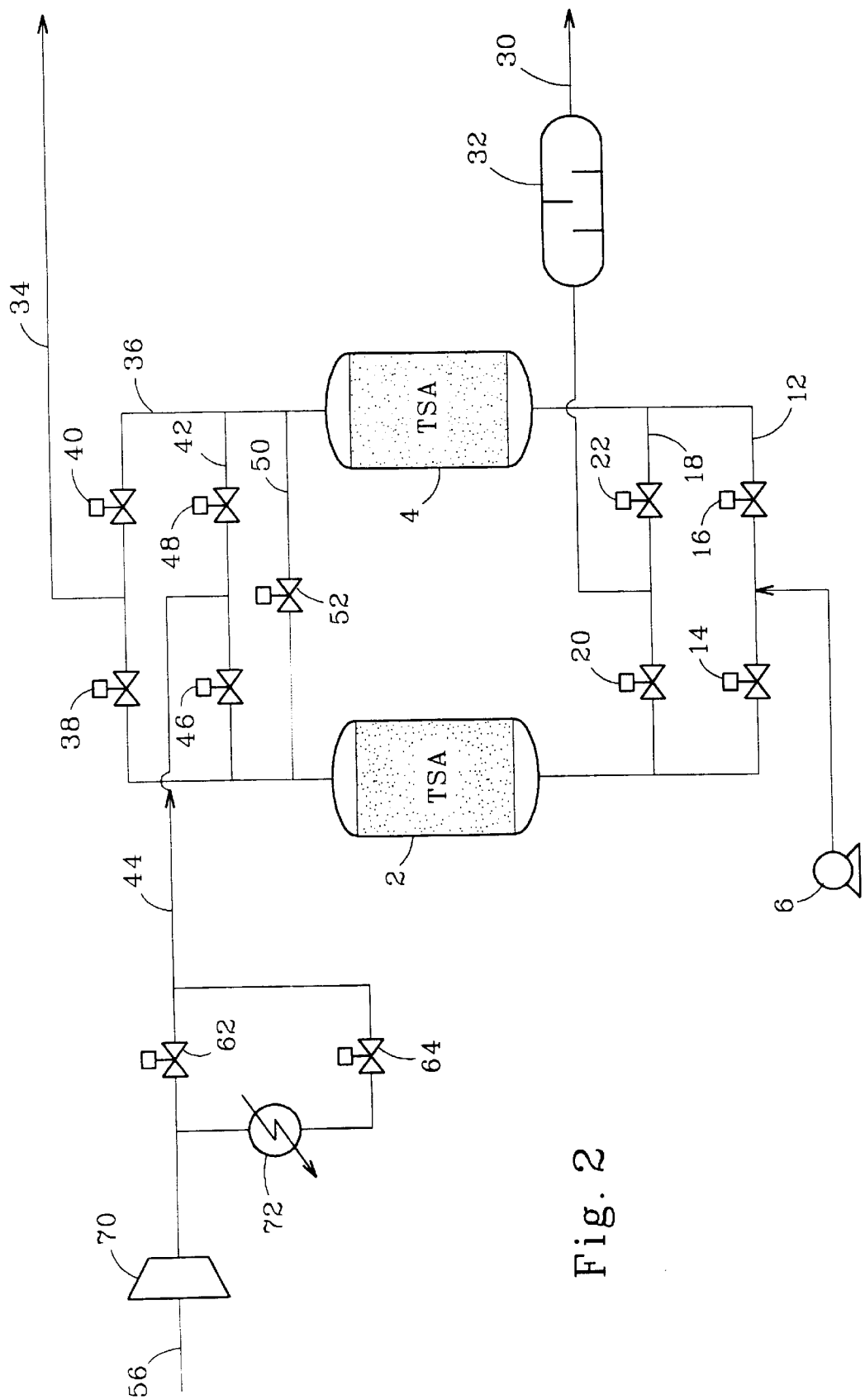
FIG. 2 shows in a similar manner a second embodiment which is a modification of that of FIG. 1.

A further option is direct compression of the purge stream to a desired pressure whereby the heat of compression is utilised to provide the desorption energy for the TSA system. This is illustrated in FIG. 2 in which the arrangement is identical to that shown in FIG. 1 except that heat exchangers 8, 10 and 66 are omitted. The purge gas is instead heated as a result of being compressed in a compressor 70, with cooling when appropriate in a cooler 72 controlled by valves 62, 64.

Those skilled in the art of machinery design realise that the extent of the temperature rise is a function of the pressure ratio across the compressor. The regenerating gas at a positive pressure leaving in the line 30 would in general be used in a subsequent downstream process.

Figure 3:
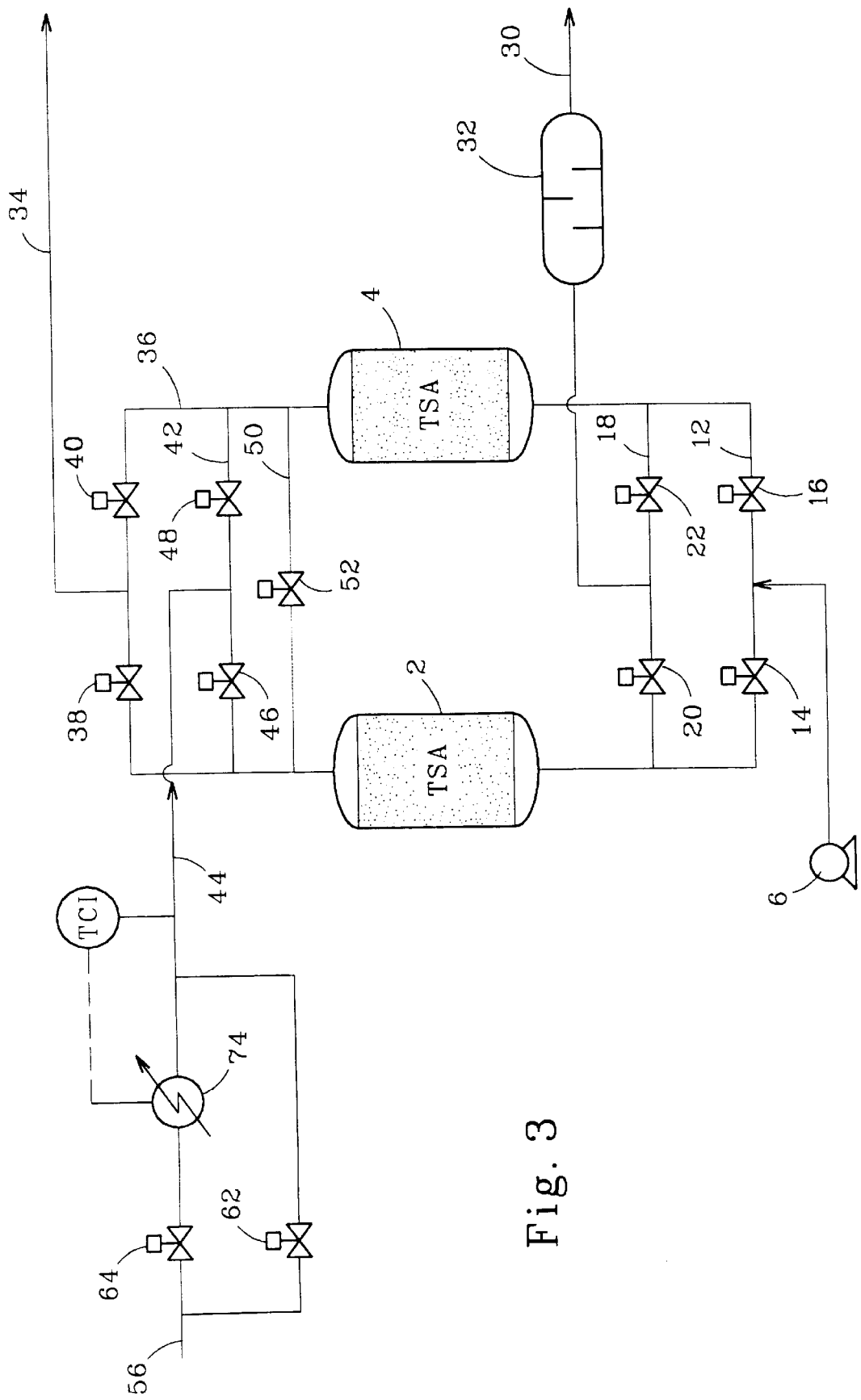
FIG. 3 shows in a similar manner a third embodiment.

An alternative arrangement is shown in FIG. 3 in which the compressor 70 is omitted and the purge gas is heated in a heater 74 when required and supplied via a bypass controlled by valves 62, 64 when heating is not required.

Optionally, a subcooler may be provided between the main air compressor 6 and the inlet manifold 12.

Figure 4:
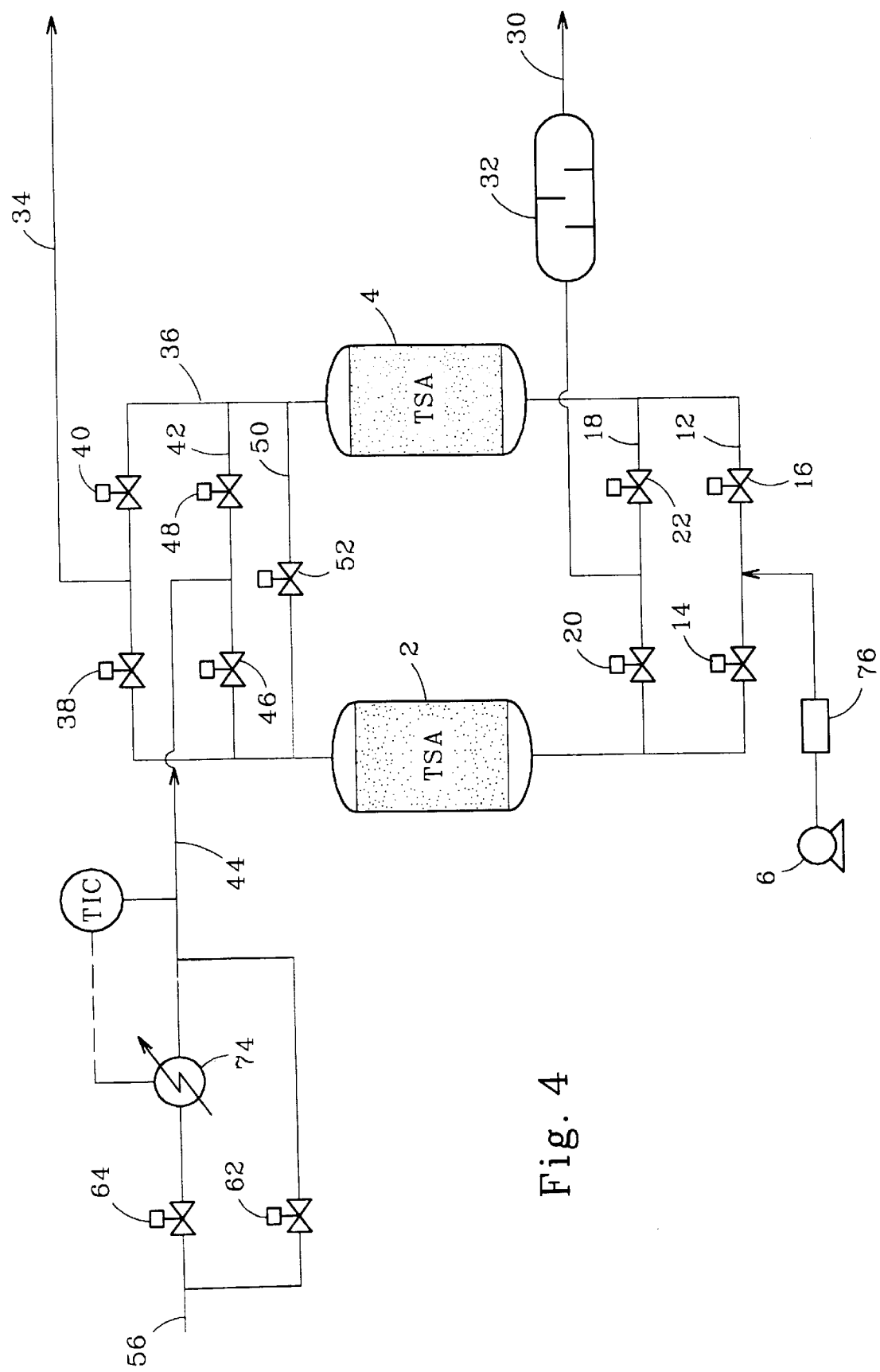
FIG. 4 shows in a similar manner a fourth embodiment.

This is shown in FIG. 4 which is the same as FIG. 3 except for the provision of subcooler 76 after the main air compressor 6.

As indicated previously, the adsorbent may be activated alumina of a conventional kind or it may be a modified activated alumina which has been impregnated with a basic material to improve its capacity.

A modified alumina for use in the invention may be prepared by making a solution of the chosen basic compound having an appropriate pH as described above and adding the solution to an alumina in a volume just sufficient to fill the pores of the alumina without producing surface wetness. The concentration and the amount of the solution may be chosen to produce a loading of the compound on the alumina of from 1 to 15 percent on a dry weight basis, e.g., 1 to 10 percent.

The treated alumina should be dried at a temperature which is not so high as to produce decomposition of the added compound to produce oxide which will bind carbon dioxide in a manner which cannot be reversed by reducing the gas pressure and heating to a low temperature, e.g., by 50° C., but only by elevated temperature. Thus U.S. Pat. No. 4,433,981 discloses treating alumina with a solution of sodium carbonate or other compounds, drying at 100° C., and then heat treating further at 575° C. This second heating step produces a material which is unsuitable for use in the processes of this invention.

Drying is therefore preferably carried out at below 200° C., more preferably below 150° C.

The compound used to impregnate the alumina for use in the present invention should not cause water to react with the adsorbent so that it is not desorbed under the temperature swing conditions used. Nonreversible adsorption of water will progressively interfere with the adsorption of carbon dioxide.

The invention will be further illustrated by the following examples. In the following examples, zero point charges of aluminas are measured by placing 20 grams of alumina in water and testing the pH after 24 hours. Henry's law constants ($K_2$) were measured as initial isotherm slopes in units of mmole/gram/atm after outgassing at a pressure of 50 microns of Hg (6.7 Pa) for 16 hours at 25° C., followed by repeated dosing with $CO_2$ at 30° C. and subsequent evacuation at 50 microns Hg (6.7 Pa) pressure for 16 hours. Initial Henry's law constants ($K_1$) were measured similarly during the first dosing with $CO_2$. High $K_1$ values represent a larger capacity for adsorbing carbon dioxide in a manner that is reversible only by high temperature treatment. High $K_2$ values indicate the high regenerable (by pressure swing or by TSA at low temperatures) capacities desired for the present invention.

EXAMPLE 1

An activated alumina was impregnated with various solutions of differing pH. In each case, sufficient solution was added to just fill the pore volume of the alumina, the concentration of the solution being such as to produce a 5 percent by weight (solute/total weight of solids) loading of the solute on the alumina after drying at 120° C. Henry's law constants were then measured, giving the results shown in Table 1 below.

TABLE 1

| Adsorbent | pH of impregnating solution | (mmole/g/atm) $K_1$ | (mmole/g/atm) $K_2$ |
| --- | --- | --- | --- |
| Alcan AA-300 | — | 14.8 | 5.6 |
| 5% Fe(NO$_3$)$_3$ | 1.2 | 1.3 | 1.2 |
| 5% Citric Acid | 1.7 | 0.92 | 0.88 |
| 5% CsI | 5.8 | 2.0 | 1.6 |
| 5% NH$_4$HCO$_3$ | 7.8 | 6.3 | 4.9 |
| 5% (NH$_4$)$_2$CO$_3$ | 8.9 | 6.6 | 5.8 |
| 5% K$_2$CO$_3$ | 11.4 | 81.0 | 22.8 |
| 5% Na$_3$PO$_4$ | 12.7 | 12.4 | 12.2 |
| 5% NaOH | 13.1 | 340 | 15.1 |

The results in Table 1 clearly show that impregnation of alumina with acidic solutions reduces the $CO_2$ capacity of the material. In addition, basic solutions above a pH of 9 significantly increase the $K_2$ value for $CO_2$ indicating that making the surface of alumina more basic enhances $CO_2$ capacity.

EXAMPLE 2

This example demonstrates that the increase in adsorptive capacity we have obtained is dependent on pH and not merely the identity of the solute used. To show this, $K_2CO_3$ impregnating solutions were buffered to pH's of 13.8, 10.4 (the zpc of the Alcan AA-300) and 4. These solutions were used to make a 5 wt % impregnation by aqueous incipient wetness technique. $CO_2$ isotherms were then measured as described above at 30° C. Again the low pressure data was compared using the Henry's law constant. The results are shown in Table 2.

TABLE 2

| Solution pH | $K_2$ (mmole/g/atm) |
| --- | --- |
| K$_2$CO$_3$ adj to 13.8 | 6.3 |
| K$_2$CO$_3$ adj to 10.41 | 10.8 |
| K$_2$CO$_3$ adj to 4.0 | 0.6 |

Clearly the acidic impregnated sample had its performance reduced, but the more basic solution also lost some performance when compared to the less basic solution (pH= 10.41). This unexpected result shows that the highest regenerable $CO_2$ capacity is achieved by using impregnant that are equally or slightly more basic than the natural zero point charge of the adsorbent alumina.

EXAMPLE 3

Aqueous solutions prepared from mixtures of various salts were prepared to make 5 wt % impregnations on Alcan AA-300 alumina. $CO_2$ isotherms were then measured on the samples as described above. The results of this testing is shown in Table 3.

TABLE 3

| Sample (all 5 wt %) | pH | (mmole/g/atm) $K_1$ | (mmole/g/atm) $K_2$ |
| --- | --- | --- | --- |
| Ammonium Bicarbonate/Ammonium Formate | 7.78 | 2.7 | 2.1 |
| Ammonium Bicarbonate/Ammonium Formate | 7.81 | 16.2 | 6.0 |
| Ammonium Bicarbonate/Ammonium Carbonate | 9.0 | 49.2 | 13.2 |
| NaOH/Ammonium Bicarbonate | 11.19 | 223.5 | 27.3 |
| Sodium Carbonate | 11.4 | 188 | 12.4 |
| NaOH/Sodium Bicarbonate | 13.34 | 55.4 | 14.5 |
| NaOH/Sodium Formate | 13.58 | 349.3 | 11.1 |
| NaOH/Sodium Benzoate | 13.97 | 232.7 | 19.0 |

The results in Table 3 show that regenerable $CO_2$ adsorption enhancement is achieved when the impregnation solution is of pH>9. This effect reaches a maximum around the natural ZPC of the alumina and starts to drop off with increasing pH's with a noticeable drop off with pH's>13.4. At these high pH's for the impregnating solution, the initial Henry's Law constant is quite high. However, after vacuum regeneration the large reduction in the measured Henry's Law constant shows that significant amount of $CO_2$ adsorbed on the first pass are chemisorbed and not removable without using high temperatures.

EXAMPLE 4

The utility of aluminas impregnated with basic salts was also treated by measuring $CO_2$ breakthrough curves. Breakthrough curves were measured in a 6 foot by 1 inch column with a feed gas stream of 400 ppm(v) $CO_2$ in air at an inlet pressure of 100 psig (689.5 kPa) and an adsorption temperature of 22° C. The feed flow rate was 27 lbmoles/ft²/hr (131 kgmole/m²/hr). By simple mass balance on the column the $CO_2$ capacity of different adsorbents and the $CO_2$ mass transfer zone length were determined. The results of the breakthrough measurements are given in Table 4.

TABLE 4

| Adsorbent | (mmole/g) $CO_2$ capacity | inches (cm) Mass Transfer Zone |
| --- | --- | --- |
| AA-300 | 0.11 | 14 (35.6) |
| 5% $K_2CO_3$ on AA-300 | 0.25 | 16 (40.6) |
| 5% $Na_3PO_4$ on AA-300 | 0.17 | 14 (35.6) |

The results in Table 4 show that the $CO_2$ capacity from air on alumina impregnated with basic salts is greater than that of untreated alumina. In addition, this increased capacity is achieved without an increase in the mass transfer zone length needed for $CO_2$ adsorption. Further, it is clearly shown that $CO_2$ is adsorbed in the absence of water, contrary to the teaching of Gidaspow.

EXAMPLE 5

A comparison of a process according to the invention and a conventional TSA air purification using a two layer bed of alumina followed by 13X molecular sieve to adsorb water and $CO_2$ from an air feed stream is summarised in the following Table 5.

TABLE 5

|  |  | Mole Sieve TSA | Alumina TSA |
| --- | --- | --- | --- |
| No. Beds |  | 2 | 2 |
| Adsorbent |  | 13X/Alumina | 5% $K_2CO_3$ on AA300 |
| Pressure | bara | 6 | 6 |
| Feed Temp | °C. | 18.2 | 30 |
| On Line | min | 420 | 92 |
| Heat Time | min | 180 | 45 |
| Max Pulse Temp | °C. | 160 | 80 |
| P/A | — | 0.1 | 0.45 |
| TSA Power Utilisation (external) | kW/Nm³/.h air | 0.00218 | 0.0000 (if heat recovery is used) |
| Switch Loss | % | 0.05850 | 0.20462 |
| MAC Power | kW/Nm³/h.air | 0.07671 | 0.07671 |
| Switch Loss MAC Power Inc | kW/Nm₃/h.air | 0.00004 | 0.00016 |
| Productivity | Nm³ air/kg ads | 2.96 | 2.91 |
| Productivity | Nm³ air m³ bed | 2223.44 | 2764.07 |

Clearly, an alumina TSA is superior in that optionally no heat is imported to aid regeneration, cheaper components may be used due to the lower temperatures involved and no external insulation is needed. Alumina is cheaper than molecular sieve. The cost of heat recovery system is normally offset by the saved cost of chilling needed in a molecular sieve TSA. Lastly, high feed temperatures can be tolerated.

EXAMPLE 6

Use of Basic Salt Loaded Alumina in Low Temperature TSA

Air purification to remove $H_2O$ and $CO_2$ and trace hydrocarbons was performed using a bed of AA300 (1.2–2.4 mm) activated alumina impregnated with 5% w/w $K_2CO_3$. The purge step is in two parts. In the first step the system is purged by preheating the purge stream at 80° C. In the latter part the system is regenerated at 28° C. by which the adsorbent bed is also cooled down. Conditions were as follows:

Pressure: 6.5 bara
Feed Temperature: 30° C.
P/A Ratio=0.45
Purge Pressure 1.1 bara
Cycle Time=184 min
Adsorbent Quantity=18 kg
Air Flow=58 Nm₃/h
Feed Humidity=100%
Feed $CO_2$ Content=380 ppm v/v Therefore the bed productivity=4.16 kg air/kg adsorbent.

The process described in this and other examples according to the invention differs from that in U.S. Pat. No. 3,865,924 in that we find that substantially all of the carbon dioxide is adsorbed in a region of the bed of adsorbent downstream from the region in which water is adsorbed, so that the gas from which the carbon dioxide is adsorbed and the adsorbent are both dry. In U.S. Pat. No. 3,865,924, it is indicated that the adsorbent described there only works to adsorb carbon dioxide when stoichiometric quantities of water are available.

EXAMPLE 7

Feed Conditions: 400 ppm $CO_2$, Full Water Saturation, 1 ppm $C_2H_2$

In this example an adsorbent bed was used comprising a lower (upstream) alumina portion and (except in run 1 and run 3) a smaller, upper (downstream) zeolite portion, the proportions of these being varied in different runs.

TABLE 6

| Run |  | 1 | 2 | 3 | 4 | 5 |
| --- | --- | --- | --- | --- | --- | --- |
| % Normal Alumina | % v/v | 100 | 80 | — | — | — |
| % $K_2CO_3$ Alumina | % v/v | — | — | 100 | 80 | 80 |
| % Mole Sieve | % v/v | — | 20 | — | 20 | 20 |
| Feed Pressure | bara | 7.8 | 7.8 | 7.8 | 7.8 | 7.8 |
| Feed Temp | C. | 20 | 20 | 20 | 20 | 20 |
| P/A Ratio | — | 0.5 | 0.5 | 0.45 | 0.45 | 0.45 |
| Heat Time | min | 35 | 35 | 25 | 25 | 25 |
| Cool Time | min | 30 | 30 | 40 | 40 | 40 |
| Capacity | kg/hr Air/kg ads | 3.8 | 3.2 | 4.93 | 4.14 | 7.1 |
| Max Regen Temp | C | 100 | 100 | 80 | 80 | 80 |
| $C_2H_2$ Removal | % | 50 | 100 | 60 | 100 | 100 |
| % $CO_2$ Adsorbed by Alumina | % | 100 | 100 | 100 | 100 | 80 |

In the above Table the conditions used and results obtained in five runs are set out. As can be seen, the use of a subsidiary layer of zeolite enables complete removal of acetylene to be achieved. Furthermore, if the on-line period is extended to produce breakthrough of adsorbed components, we find that the carbon dioxide begins to appear at the outlet end of the adsorbent bed well before any acetylene. Accordingly, this provides a valuable safety feature in that one can be sure that so long as no carbon dioxide is passing the adsorbent, the purified gas will be acetylene free.

The invention has been described above with reference to preferred embodiments. It should be appreciated however that many modifications and variations thereof are possible within the scope of the invention. For instance, more than two adsorbent vessels may be employed, as described in U.S. Ser. No. 08/539,093 filed 4 Oct. 1995, now U.S. Pat. No. 5,656,065 (EP96307220.2), which is hereby incorporated by reference.

We claim:

1. A process for the temperature swing adsorption of at least carbon dioxide and water from a feed gas to form a purified gas for subsequent cryogenic treatment, comprising contacting the feed gas at a first temperature with a solid adsorbent comprising agglomerates of activated alumina, impregnated with an adsorption enhancing impregnant of a basic solution having a pH of 9 or more, to adsorb all of said water and substantially all of said carbon dioxide so as to produce a dry, purified gas from which at least most of the carbon dioxide has been removed, and periodically regenerating the adsorbent by contacting the adsorbent with a regenerating gas at a second temperature in excess of said first temperature but below a calcining temperature of the impregnant to desorb said carbon dioxide and water from said adsorbent by said regenerating gas at said second temperature.

2. A process as claimed in claim 1, wherein the feed gas is air, natural gas or synthesis gas.

3. A process as claimed in claim 2, further comprising the subsequent cryogenic separation of said air.

4. A process as claimed in claim 1, wherein the pH of the impregnating solution is at least 10.

5. A process as claimed in claim 1, wherein the pH of the impregnating solution is from 10 to 12.

6. A process as claimed in claim 1, wherein the pH of the impregnating solution is about 11.

7. A process as claimed in claim 1, wherein the pH of the impregnating solution is related to the zero point charge of the alumina according to the formula:

$$pH \geq zpc - 1.4$$

8. A process as claimed in claim 7, wherein the pH of the impregnating solution is related to the zero point charge of the alumina by the formula:

$$zpc + 2 \geq pH \geq zpc - 1.4$$

9. A process as claimed in claim 7, wherein the pH of the impregnating solution is related to the zero point charge of the alumina by the formula:

$$zpc + 1 \geq pH \geq zpc - 1.$$

10. A process as claimed in claim 1, wherein said basic solution is a solution of an alkali metal or ammonium compound.

11. A process as claimed in claim 10, wherein said compound is selected from the group consisting of hydroxides, carbonates, bicarbonates, phosphates, and organic acid salts.

12. A process as claimed in claim 1, wherein the feed gas is supplied at a pressure of from 2 to 20 bara.

13. A process as claimed in claim 1, wherein the feed gas is supplied at a pressure of from 2 to 15 bara.

14. A process as claimed in claim 1, wherein the feed gas is supplied at a temperature of from 5° to 50° C.

15. A process as claimed in claim 1, wherein the feed gas is supplied at a temperature of from 10° to 40° C.

16. A process as claimed in claim 1, which is operated at a P/A ratio of from 0.1 to 0.8.

17. A process as claimed in claim 1, which is operated at a P/A ratio of from 0.2 to 0.5.

18. A process as claimed in claim 1, wherein feed gas is fed to the adsorbent for a period of from 60 to 600 minutes prior to regeneration of the adsorbent.

19. A process as claimed in claim 1, wherein feed gas is fed to the adsorbent for a period of from 70 to 300 minutes prior to regeneration of the adsorbent.

20. A process as claimed in claim 1, wherein the gas for regenerating the adsorbent is fed at a temperature of from 30° to 150° C. which exceeds the temperature of the feed gas supplied to the adsorbent by from 25° to 110° C.

21. A process as claimed in claim 1, wherein the regenerating gas is fed to the adsorbent at a pressure of from 0.5 to 8 bara.

22. A process as claimed in claim 1, wherein the regenerating gas is fed to the adsorbent at a pressure of from 1 to 3 bara.

23. A process as claimed in claim 1, wherein said adsorbent further includes a body of zeolite downstream (in the direction of feed gas flow) from the alumina adsorbent for adsorbing residual carbon dioxide and/or hydrocarbons.

24. A process as claimed in claim 23, wherein the zeolite adsorbent makes up from 5 to 30% v/v of the total adsorbent.

25. A process as claimed in claim 23, wherein at least 70 percent of the carbon dioxide is adsorbed in the alumina adsorbent.

26. A process as claimed in claim 23, wherein at least 80 percent of the carbon dioxide is adsorbed in the alumina adsorbent.

* * * * *